(12) United States Patent
Leduc et al.

(10) Patent No.: US 10,267,172 B2
(45) Date of Patent: Apr. 23, 2019

(54) ROTARY ASSEMBLY FOR A TURBOMACHINE

(71) Applicant: Snecma, Paris (FR)

(72) Inventors: Mathieu Louis Jean Leduc, Moissy-Cramayel (FR); Pierre-Louis Alexandre Carlos, Moissy-Cramayel (FR); Clement Roussille, Bordeaux (FR)

(73) Assignee: Snecma, Paris (FR)

( * ) Notice: Subject to any disclaimer, the term of this patent is extended or adjusted under 35 U.S.C. 154(b) by 405 days.

(21) Appl. No.: 15/024,274

(22) PCT Filed: Sep. 23, 2014

(86) PCT No.: PCT/FR2014/052376
§ 371 (c)(1),
(2) Date: Mar. 24, 2016

(87) PCT Pub. No.: WO2015/044579
PCT Pub. Date: Apr. 2, 2015

(65) Prior Publication Data
US 2016/0222810 A1  Aug. 4, 2016

(30) Foreign Application Priority Data

Sep. 25, 2013  (FR) ..................................... 13 59237

(51) Int. Cl.
*F01D 5/08* (2006.01)
*F01D 5/22* (2006.01)
(Continued)

(52) U.S. Cl.
CPC ............ *F01D 11/006* (2013.01); *F01D 5/087* (2013.01); *F01D 5/22* (2013.01); *F01D 5/3007* (2013.01);
(Continued)

(58) Field of Classification Search
CPC .... F01D 11/001; F01D 11/005; F01D 11/006; F01D 5/02; F01D 5/085; F01D 5/087;
(Continued)

(56) References Cited

U.S. PATENT DOCUMENTS 4,192,633 A * 3/1980 Herzner .................... F01D 5/10
                                                           415/119
6,899,520 B2 * 5/2005 Habedank ................. F01D 5/06
                                                           415/174.5
(Continued)

FOREIGN PATENT DOCUMENTS

EP      0 286 227 A2    10/1988
EP      1 607 579 A1    12/2005
(Continued)

*Primary Examiner* — Richard A Edgar
*Assistant Examiner* — Elton K Wong
(74) *Attorney, Agent, or Firm* — Blank Rome LLP

(57) ABSTRACT

The invention concerns a rotary assembly for a turbomachine, comprising:
  a disc (16) having an external periphery having an alternation of slots (22) and teeth (20),
  blades (14) extending radially from the disc (16), and the roots (24) of which are engaged axially and held radially in the slots (22) of the disc,
  platforms (30) extending circumferentially from the blades (14) and which are arranged circumferentially end to end, opposite each other,
  axial sealing means upstream and/or downstream of an annular zone extending radially from the platforms (30) as far as the disc (16).

According to the invention, the sealing means comprise radially an internal annular part (64) and an external annular part (66) structurally separate from each other, and the facing radial ends of which are adapted for a relative radial movements by sliding sealingly, only an absorption of the (Continued)

centrifugal forces of the external part (66) being provided rotationally by the platforms (30).

12 Claims, 3 Drawing Sheets

(51) Int. Cl.
*F01D 5/30* (2006.01)
*F01D 11/00* (2006.01)

(52) U.S. Cl.
CPC .......... *F01D 5/3015* (2013.01); *F01D 11/001* (2013.01); *F05D 2220/323* (2013.01); *F05D 2300/6033* (2013.01); *Y02T 50/672* (2013.01)

(58) Field of Classification Search
CPC ........ F01D 5/22; F01D 5/3007; F01D 5/3015; F05D 2300/6033; Y02T 50/672
See application file for complete search history.

(56) References Cited

U.S. PATENT DOCUMENTS

| | | | |
|---|---|---|---|
| 2010/0189556 A1* | 7/2010 | Propheter-Hinckley | F01D 5/284 415/200 |
| 2011/0027103 A1 | 2/2011 | Philippot | |
| 2012/0093649 A1* | 4/2012 | Halfmann | F01D 5/3015 416/95 |

FOREIGN PATENT DOCUMENTS

| | | |
|---|---|---|
| FR | 2 965 291 A1 | 3/2012 |
| FR | 2 978 793 A1 | 2/2013 |

\* cited by examiner

ROTARY ASSEMBLY FOR A TURBOMACHINE

The invention relates to a rotary assembly for a turbomachine, such as in particular an aeroplane turbojet engine, as well as to a turbomachine comprising such an assembly.

Such an assembly, which is found in particular in a turbine, comprises a disc, and blades extending radially from the disc and the roots of which are engaged axially and held radially in alveoli or slots on the external periphery of the disc, said slots being disposed in alternation with teeth of the disc. The blades also comprise internal platforms arranged circumferentially end to end so as to define together the internal limit of the flow of hot gases flowing in the turbine. The part of the blade situated internally with respect to the flow path, that is to say between the internal platform and the root, is referred to as the stilt. According to this arrangement, spaces are formed between two adjacent stilts, and form inter-stilt or inter-blade cavities. Cavities known as alveolus bottoms are also formed in radial spaces situated between the blade roots and the bottoms of the slots.

In order to improve the performances of the turbomachine and to prevent heating of the disc by the flow of hot gases issuing from an upstream combustion chamber flowing through the flow path, it is important to limit to the maximum possible extent the flow of these gases under the platforms and through the inter-blade cavities, using sealing means. This is because the portion of the flow gases flowing under the platforms does not participate in the rotational driving of the blades and directly heats the teeth of the disc. It is particularly advantageous to arrange the sealing means downstream of the inter-blade cavities in order to allow pressurisation of these cavities to a level substantially identical to that of the flow gases, which limits the aspiration effect in the cavities.

To this end, extending the platforms at their upstream and/or downstream ends by walls extending radially towards the inside as far as the teeth of the disc in order to axially close off the inter-blade cavities is known. However, each pair of adjacent walls is inevitably separated circumferentially by an interstice allowing the flow of the gases. The number of interstices, corresponding to the number of blades, is then too great to allow acceptable sealing of the inter-blade cavities.

According to another known solution, an annular metal ring, formed by a radial annular wall comprising a single radial slot, or formed approximately by seven sectors arranged end to end, is arranged downstream of the inter-blade cavities. The external annular end of the ring is inserted in a groove extending over the internal faces of the platforms, and its internal annular end is held clamped against the teeth of the disc and the blade groups by a downstream element such as a labyrinth ring. The ring offers the advantage of having almost no interstice for a flow of the gases, once mounted, and therefore provides a good seal. However, in rotation, the ring bears on the platforms by centrifugal effect with a relatively high force, which risks impairing the integrity of the platform, or requires undesirable oversizing of the latter.

Furthermore, when the blades are produced from a ceramic matrix composite (hereinafter abbreviated to CMC), the platforms, also made from CMC, are even less able to support the weight of the ring in rotation, the density ratio between a metal material and a CMC material being between three and four. In addition, the expansion ratio when temperature increases being between two and three, the differential expansions in functioning between the ring on the one hand and the blades and disc on the other hand risk either accentuating the stresses generated on the platforms, or allowing clearances to arise, allowing flow of the gases at the radial ends of the ring.

The present invention affords a simple, effective and economical solution to the problem of sealing of the inter-blade cavities, while dispensing with the drawbacks related to the solutions of the prior art.

To this end, it proposes a rotary assembly for a turbomachine, comprising:
  a disc having an external periphery having an alternation of slots and teeth,
  blades extending radially from the disc, and the roots of which are engaged axially and held radially in the slots of the disc,
  platforms extending circumferentially from the blades and which are arranged circumferentially end to end, opposite each other,
  axial sealing means for an upstream and/or downstream sealing of an annular zone extending radially between the platforms and the disc,
characterised in that said sealing means comprise radially an internal annular part and an external annular part structurally separate from each other, the external part of the sealing means comprising a frustoconical wall extending inwards from its external end, and the internal part of the sealing means comprising at its external end an annular rim in a step and in axial abutment against the internal end of the frustoconical wall, which can slide radially along the stepped rim of the internal part, an annular seal being interposed axially between the axial ends of the blades and the frustoconical wall of the external part.

By means of the invention, the platforms rotationally support a much lower load, since the sealing means are radially separated into two parts, only the external part being held rotationally by the platforms. The internal part will be able to be held rotationally, for example by the disc or by another rotary turbine element such as a labyrinth ring. Thus the load supported by the platforms by centrifugal effect may be very greatly reduced, which opens more freedom of design with regard to the blade, such as a CMC design, and more generally makes it possible to reduce the fatigue on the platforms. Moreover, as the two parts of the sealing means are adapted for relative radial movements, the differential expansions involve only a modification to the relative radial positions of the two parts, and do not give rise to the creation of stresses or clearance between the sealing means and the platforms. Finally, the sliding between the facing radial ends of the two parts makes it possible to preserve an axial seal for the annular zone extending radially from the platforms as far as the disc, which comprises the inter-blade cavities, this sealing being equivalent to that permitted by sealing means formed by a single annular element.

In particular, the facing radial ends of the internal annular part and of the external annular part are adapted for relative radial movements by sliding sealingly.

In particular, because of the radial movements possible between said external and internal annular parts, only an absorption of the centrifugal forces of the external part is provided rotationally by the platforms.

Preferentially, the sealing means of the invention are formed downstream of said annular zone in order to allow pressurisation of the inter-blade cavities at a level substantially identical to that of the stream gases, which limits the aspiration effect in these cavities.

According to another feature of the invention, the internal annular part and the external annular part of the sealing means comprise respectively two rings held axially and radially with regard to the annular zone extending radially between the platforms and the disc.

Such attached rings seal the inter-blade cavities particularly effectively, since mounting thereof can easily be done without the formation of clearances allowing the flow-path gases to leak.

These rings may be split or sectorised rings, according to the assembly requirements.

Preferentially, air-circulation means are formed on the disc and/or the internal part of the sealing means, and are configured so as to allow the air to circulate between the upstream and/or downstream side of the rotary assembly and the alveolus bottoms.

This is because it is important, despite the mounting of the sealing means according to the invention, for cooling air to be able to freely circulate axially through the bottoms of the slots, in order to provide cooling of the disc.

According to another feature of the invention, the external part of the sealing means comprises an external end engaged in a radial annular groove formed on the internal faces of the platforms. Preferably, the internal part of the sealing means provides axial locking of the external part against the annular zone extending radially from the platforms as far as the disc.

Advantageously, the internal part of the sealing means is held radially by the disc.

The internal part of the sealing means may advantageously be held axially against the disc and the blades by an annular arm of a sealing ring comprising annular sealing lips intended to cooperate sealingly with an external stator element.

An axial contact will advantageously be achieved between the internal part of the sealing means and the assembly consisting of the disc and blades at least radially at the bearing zones between the teeth of the disc and the blade roots in operation, in order to provide the seal between the alveolus-bottom cavities and the inter-blade cavities.

Preferentially, the internal part of the sealing means comprises an annular part in the form of a hook engaged with at least one rim of one of the faces of the disc for radial relative locking.

In a particular embodiment of the invention, the rims of the disc are formed by internal faces of a plurality of projecting portions situated on one of the faces of the disc internally with respect to the bottoms of the slots of the disc, and following each other circumferentially discontinuously.

Advantageously, the annular hook part of the internal part of the sealing means extends radially from the zone situated radially between:
the bearing locations of the teeth of the disc against the blade roots in operation, and
the bottoms of the slots,
as far as the internal faces of the projecting portions, and furthermore is not in axial abutment against the disc, at least locally.

By virtue of this embodiment, the cooling air entering or leaving the slots can circulate radially between the annular hook of the internal part and the disc, as well as at the discontinuities formed between the projecting portions, and can therefore communicate with an element foreign to the rotary assembly. In addition, the internal part of the sealing means can easily provide a seal between the alveolus-bottom cavities and the inter-blade cavities outside the annular hook part.

The rims of the disc may in another way be formed by internal faces of a plurality of projecting portions situated on the external parts of the radial faces of the teeth of the disc, and following each other circumferentially discontinuously, the internal end of the annular hook part engaged on these internal faces furthermore being in axial contact with the teeth of the disc and the blade roots at the locations where the teeth of the disc bear against the blade roots in operation.

By virtue of this embodiment, the annular hook part leaves free the circulation of air through the alveolus-bottom cavities. In addition, the seal between the alveolus-bottom cavities and the inter-blade cavities is preserved by means of the internal end of the annular hook part in contact on the teeth of the disc and the blade roots.

According to a first embodiment, the external part of the sealing means comprises a frustoconical wall extending towards the inside from its external end, and the internal part of the sealing means comprises, at its external end, a stepped annular rim in axial abutment against the internal end of the frustoconical wall, which can slide radially along the stepped rim of the internal part. An annular seal is interposed axially between the axial ends of the blades and the frustoconical wall of the external part in order to sealingly press the internal end of the frustoconical wall against the annular stepped rim of the internal part.

By virtue of this embodiment, in rotation, the annular seal extends outwards and forces the frustoconical wall against the stepped rim of the internal part, so as to provide an optimum seal.

According to a second embodiment, the internal part of the sealing means is connected at its external end to two radial annular branches spaced apart axially from each other, and the external part comprises a radial annular wall, the internal end of which is engaged between the two branches of the internal part and can move therein radially, the axial clearance separating the two branches with respect to the radial annular wall being substantially zero.

In operation, the difference in pressure between the inter-blade cavities and the upstream and/or downstream parts of the rotary assembly connected to the flow path causes an annular offset between the branches of the internal part and the radial wall of the external part. This angular offset causes an abutment along a circumferential line between at least one of the branches and the radial wall, which provides a seal.

In a preferred embodiment of the invention, the blades comprise a ceramic matrix composite. As explained above, the invention allows the use of such a material at the blades without risking damaging the platforms.

The invention also relates to a turbomachine turbine comprising a rotary assembly as described in the present patent application.

Finally, the invention relates to a turbomachine, such as a turbojet engine or a turboprop engine, comprising a rotary assembly as described in the present patent application.

Other advantages and features of the invention will emerge from a reading of the following description given by way of non-limitative example and with reference to the accompanying drawings, in which.

Figure 1:
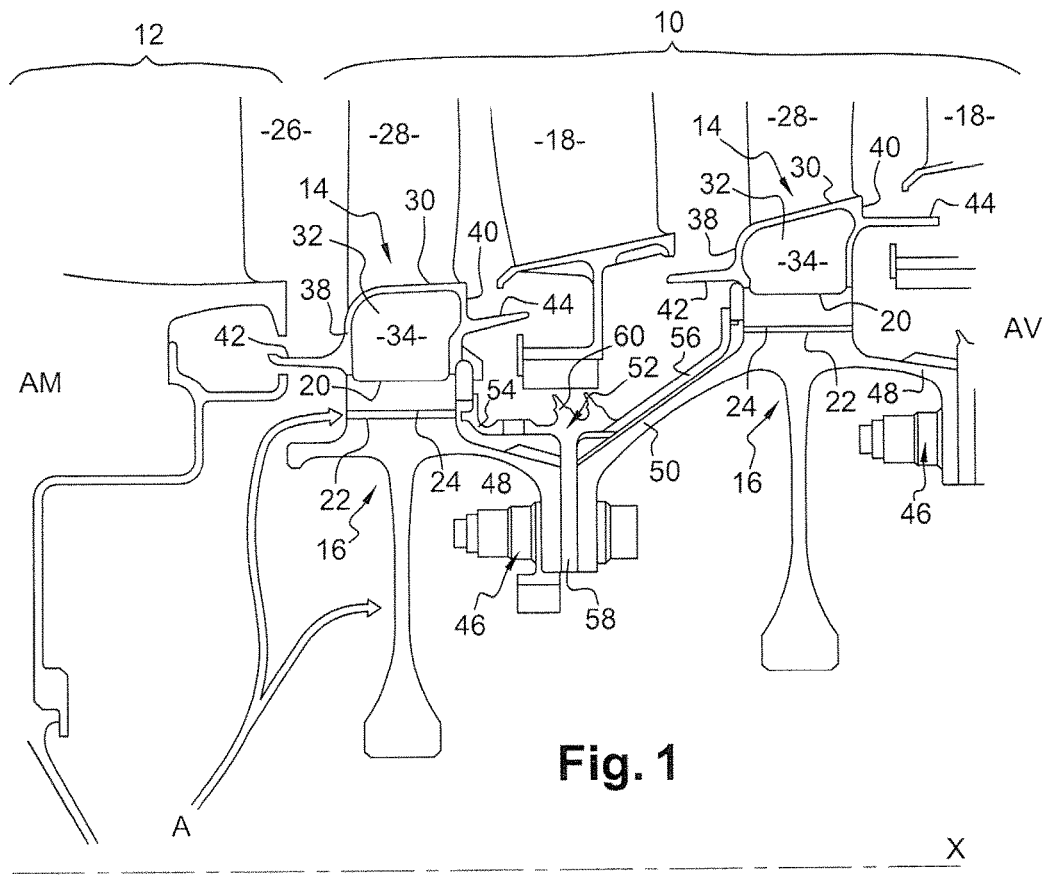
FIG. 1 is a partial schematic view in axial section of a low-pressure turbine of a turbomachine according to the prior art.
Figure 2:
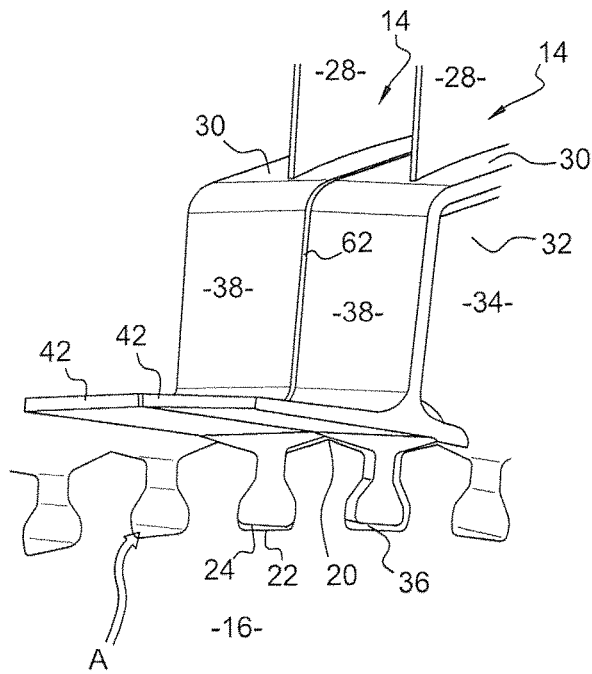
FIG. 2 is a partial schematic view in perspective from the upstream side of two adjacent blades mounted on a disc of the turbine of FIG. 1.

Reference is made first of all to FIG. 1, which depicts a low-pressure turbine 10 according to the prior art, arranged downstream of a high-pressure turbine 12, and to FIG. 2, which depicts more particularly two blades 14 mounted on a rotary disc 16 of this turbine 10. The low-pressure turbine 10 comprises an axial alternation of stages of annular rows of fixed blades 18, referred to as distributors, and stages of rotary disc 16 comprising at their peripheries a plurality of blades 14, these stages being arranged around an axis X of the turbomachine.

In the present memorandum, just as in the technical field concerned, the terms upstream AM and downstream AV are defined so that the upstream side is situated on the side from where the general flow of the turbomachine comes, and the downstream side is situated axially on the side to which this same flow flows.

Each disc 16 comprises, at its external periphery, teeth (the crown of which is referenced 20) disposed in alternation with alveoli or slots (the bottom of which is referenced 22) in which blade roots (the internal end of which is referenced 24) are engaged axially and held radially, these blades 14 extending radially from the alveoli or slots 22 in an annular flow path 26 of a hot gas flow issuing from an upstream combustion chamber (not shown).

More particularly, each blade comprises radially from outside to inside a blade 28, a platform 30 extending substantially perpendicular with respect to the axis of elongation of the blade 14, and a stilt 32 connecting the platform to the blade root 24. The blade roots 24 have a shape for example in a dovetail or the like in order to ensure radial holding thereof in the slots 22. The platforms 30 of the blades are arranged circumferentially end to end so as to define together the ideal internal limit of the flow of hot gases circulating in the turbine. According to this invention, spaces are formed between two circumferentially adjacent stilts 32, in the annular zone extending radially from the platforms 30 as far as the disc 16, and are referred to as inter-stilt or inter-blade cavities 34. So-called alveolus-bottom cavities 36 are also formed by radial spaces separating the blade roots 24 from the bottoms 22 of the slots. Walls 38, 40 extend radially inwards from the upstream and downstream sides of the platforms as far as the roots 24 of the blades and form an axial sealing means for the annular zone extending radially from the platforms 30 as far as the disc 16, and therefore the inter-blade cavities 34, providing closure thereof.

This axial sealing of the inter-blade cavities 34 is important since, if some of the flow-path gases circulate through these cavities, they do not participate in the rotational driving of the blades 14 and directly heat the teeth 20 of the disc forming the bottom of the inter-blade cavities 34, which leads to an increase in the temperature of the discs 16 that could damage them and reduce their service life.

The upstream radial wall 38 of the platform is connected to a spoiler 42 extending upstream and the downstream radial wall 40 is connected to a spoiler 44 extending downstream. The spoilers 42, 44 extend axially between the consecutive stages of the turbine in order to partly preserve the structural integrity of the stream 26 between each turbine stage, which limits the flow of hot gases radially towards the inside of the turbine.

The discs are fixed to one another by the bolting, at 46, of annular flanges 48, 50 extending axially in the direction of each other from each disc. A labyrinth ring 52 is also positioned axially between each pair of adjacent discs 16 and comprises upstream and downstream annular arms 54, 56 extending axially as far as these discs. The fixing flanges 48, 50 between the discs are thus protected from the flow-path gases by the arms 54, 56 of the labyrinth ring 52. The labyrinth ring 52 further comprises an internal radial annular wall 58 for fixing to the bolting 46 of the flanges 48, 50 of the discs, and cooperates through external annular sealing lips 60 with the internal ends of the blades 18 of the distributors, in order to limit the circulation of the flow-path gases internally with respect to these blades 18.

In order to ensure correct functioning of the turbomachine, cooling air A is taken off, in a low-pressure or high-pressure compressor for example, and routed to the internal part of the turbine as far as the alveolus-bottom cavities 36 in order to ensure cooling of the disc 16 and to protect the latter from the heating caused by the hot gases of the flow 26. In order to allow circulation of the cooling air A downstream of the alveolus-bottom cavities 36, the latter emerge downstream internally with respect to the arm 54 of the labyrinth ring 52 in axial abutment on the disc 16. This configuration enables the cooling air A to circulate more downstream radially between the labyrinth ring 52 and the fixing flanges 48, 50 between the discs 16, in order also to provide cooling.

In operation, the hot gases circulating in the flow path 26 can circulate through the interstices 62 formed between the circumferential facing edges of the upstream and downstream radial walls 38, 40 connected to the platforms 30 and axially covering the inter-blade cavities 34. The number of interstices 62 is relatively high since it depends directly on the number of platforms 30 forming the internal limit of the stream, which causes a not insignificant total leakage through the inter-blade cavities, which impairs the performances of the turbine. Moreover, the geometry of the assembly formed by these radial walls 38, 40 and the platforms 30 does not make it possible to produce the blades from ceramic matrix composite (CMC) since this would give rise in particular to problems of bending of the fibres of the material during manufacture. Recent developments lead in fact to using blades produced from CMC material. The use of this type of material makes it possible to reduce the weight of the blades and to increase their resistance to high temperatures.

In order to be able to produce the blades 14 from CMC, or to limit leakages in the inter-blade cavities 34, it is therefore necessary to design novel axial sealing means for the annular zone extending radially from the platforms 30 as far as the disc 16, these sealing means not having to give rise to an excessive weight supported by the platforms in rotation, due to centrifugal effects.

It is thus advisable to use sealing means that can be arranged upstream and/or more advantageously downstream of this zone, and being in two annular parts structurally separate from each other, one internal 64 and the other external 66. Furthermore, only the external part 66 of the sealing means is held by the platforms 30 in rotation. Thus the load supported by the platforms 30 is reduced. In addition, it is proposed to form these two parts so that their facing radial ends can move radially with respect to each other, so that the relative expansions between the blade 14 and these sealing means 64, 66 result only in a relative movement between these two parts and not in the appearance of stresses on the platforms 30 or radial clearances. In order not to allow leakages between these two parts, their radial ends are furthermore formed so as to slide on each other sealingly.

Figure 3:
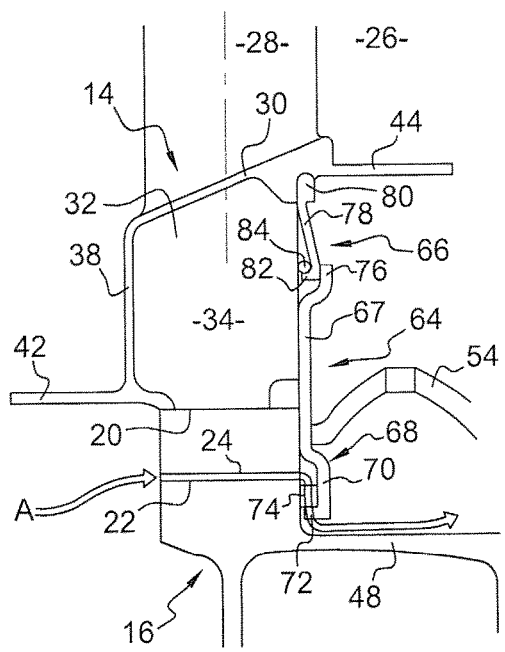
FIG. 3 is a schematic view in axial section of a rotary assembly according to a first embodiment of the invention.
Figure 4:
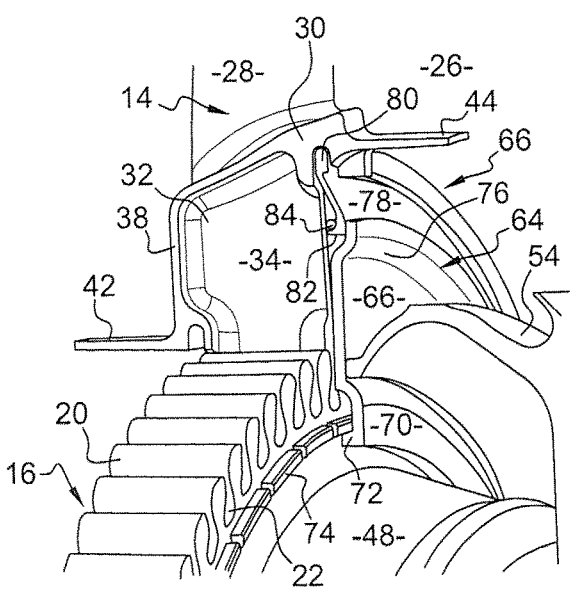
FIG. 4 is a perspective view of the rotary assembly of FIG. 3.
Figure 5:
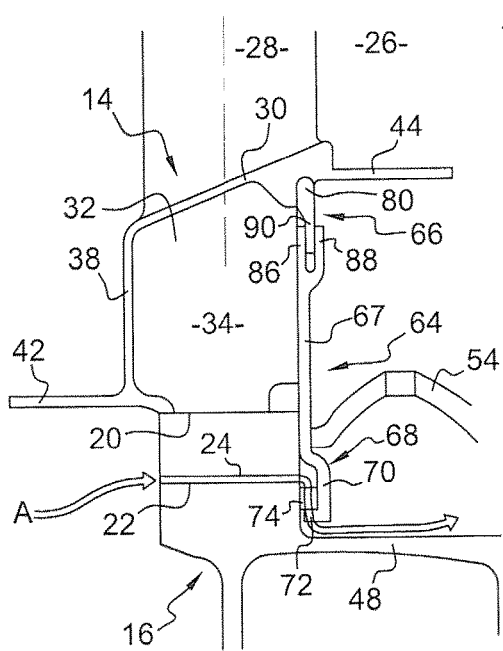
FIG. 5 is a schematic view in axial section of a rotary assembly according to a second embodiment, not forming part of the invention.
Figure 6:
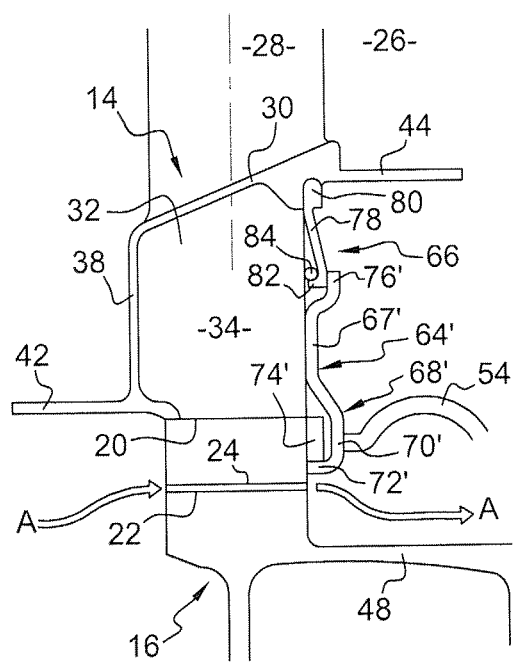
FIG. 6 is a schematic view in axial section of a rotary assembly according to a third embodiment of the invention.

The proposed solution, according to the main features mentioned above, can be analysed structurally according to three non-limitative examples depicted in the first case in FIGS. 3 and 4, in the second in FIG. 5, and in the third in FIG. 6.

In the first example depicted in FIGS. 3 and 4, the sealing means are formed downstream of the annular zone extending radially from the platforms 30 as far as the disc 16, and comprising the inter-blade cavities 34. Equivalently and symmetrically, it is possible to place these sealing means upstream of this zone.

Thus, according to the example described in FIGS. 3 and 4, the platforms 30 are connected at their upstream ends to walls 38 extending radially as far as the teeth 20 of the discs, and each comprising, in the vicinity of their internal ends, spoilers 42 extending towards the upstream side. The platforms 30 are also each connected at their downstream ends to a spoiler 44 extending towards the downstream side.

The internal part 64 of the sealing means is formed by an ring, that is to say a part extending annularly, preferably split, but which may also be formed by a plurality of sectors arranged circumferentially end to end. This internal ring 64 extends radially from inside to outside from a zone of the disc situated between the slots 22 and the flanges 48 of the disc 16 as far as approximately the middle of the stilts 32. It comprises a main radial wall 67 that is held in abutment against the downstream ends of the stilts 32 and of the teeth 20 of the disc by an upstream annular arm 54 of a downstream labyrinth ring.

The internal ring 64 further comprises, at its internal end, an annular hook part 68 engaged on the disc 16 and intended to lock the ring 64 radially. This hook part 68, connected to the internal end of the main radial wall 67, begins to extend radially from outside to inside at the teeth 20 of the disc, just inside the abutment zone of the annular arm 54 of the labyrinth ring, and inside the abutment zones between the teeth 20 of the disc and the blade roots 24 in operation. It comprises an annular wall 70 separated axially from the disc 16 and extending inwards, and connected at its internal end to an annular rim 72 oriented upstream. This rim 72 engages with projecting portions 74 formed discontinuously circumferentially on the downstream face of the disc 16, radially between the teeth 20 of the disc and the flanges 48, and which each comprise an internal cylindrical wall for supporting the rim 72 of the hook part 68.

The cooling air A coming from the alveolus-bottom cavities can escape towards the downstream end in the axial annular space left between the disc 16 and the hook part 68, and can flow towards the inside between the projecting portions 74 of the disc, between the rim 72 of the hook part and the disc, in order finally to run axially along the downstream flange 48 of the disc.

The internal part 64 of the sealing means comprises, at its external end, an annular rim 76 in a step towards the downstream end with respect to the main radial wall 67. This rim is intended to come into axial abutment towards the upstream end against the external part 66 of the sealing means in order to ensure axial holding thereof against the blades 14.

The external part 66 of the sealing means is formed by an ring, that is to say a part extending annularly, preferably formed by six to eight sectors arranged circumferentially end to end, but which may also be split. This external ring 66 extends radially from the platforms 30 as far as the stepped external rim 76 of the internal part of the sealing means. It comprises a main frustoconical wall 78 extending inwards and towards the downstream end from an external end engaged in a radial groove 80 formed on the internal faces of the platforms 30. The frustoconical wall 78 is also connected at its internal end to an annular rim 82 oriented towards the upstream end. An annular seal 84 is arranged axially between the downstream ends of the stilts 32 and the internal part of the frustoconical wall 78. The seal 84 is held radially by the internal rim 82 of the frustoconical wall.

The internal end of the frustoconical wall 78 is arranged in contact on the upstream face of the external stepped rim 76 of the internal wall 64 of the sealing means. In operation, the annular seal 84 extends circumferentially and pushes the frustoconical wall 78 downstream, which makes it possible to axially force the internal end of the frustoconical wall 78 against the stepped rim 76 of the internal part, so as to seal the interface between the internal part 64 and the external part 66 of the sealing means. In addition, the stepped rim 76 of the internal part has a radial dimension sufficient to enable the internal end of the frustoconical wall 78 to slide radially along its upstream surface, while preserving the seal between the two parts.

As is clear from this embodiment, only the external part 66 of the sealing means is rotationally supported by the platforms 30, by its abutment in the groove 80 of the internal faces of the platforms. The internal part 64, for its part, is held solely in this solution by the disc 16 by virtue of the hook part 68 engaged on the projecting portions 74.

In the example depicted in FIG. 5, the embodiment differs from the example depicted in FIGS. 3 and 4 only in that the radial wall 67 of the internal part 64 of the sealing means is connected at its external end to two annular radial branches 86, 88 separated axially, in a similar manner to a fork, and in that the external part 66 of the sealing means comprises an annular radial wall 90 extending from its external end and engaging axially between the two radial branches 86, 88.

In operation, the difference in pressure between the inter-blade cavities 34 and the downstream zone of the sealing means causes a downstream rotation of the facing ends of the internal 64 and external 66 parts of the sealing means, which causes the radial wall 90 of the external part to come into contact against one of the branches 86, 88 of the internal part, in order to provide the seal. As with the first example, sliding between the two parts is allowed by the radial dimension of the branches, while preserving the seal.

In the last example embodiment depicted in FIG. 6, the embodiment differs from the example depicted in FIGS. 3 and 4 only in that the projecting portions 74' are formed not radially between the slots 22 and the flanges 48, but on the teeth 20 of the disc, externally to the alveolus-bottom cavities 36. The main wall 67' of the internal part 64' of the sealing means is shortened radially so that the annular hook part 68' is engaged by its internal rim 72 on these projecting portions 74'. The annular arm 54 of the downstream labyrinth ring is in abutment not on the main wall 67 but on the annular wall 70' of the hook part 68'. It should be noted that axial contact is provided between the internal rim 72' of the hook part and the circumferential alternation of the teeth 20 of the disc and blade roots 24, radially at the abutment zones between the teeth 20 of the disc and the blade roots 24 in operation, in order to provide a seal between the alveolus-bottom cavities 36 and the inter-blade cavities 34.

Compared with the other examples described, this solution makes it possible to reduce the forces exerted on the internal part of the sealing means since its smaller size makes it possible to avoid the appearance of high thermal gradients. On the other hand, the location of the projecting portions 74' on the teeth 20 of the disc involves a concentration of higher mechanical forces at the internal parts of the teeth 20 of the disc attached to the disc, these projecting portions 74' serving to hold the internal part of the sealing means in operation.

The invention claimed is:

1. A rotary assembly for a turbomachine, having an axis and comprising:
    a disc having an external periphery having an alternation of slots and teeth, said disc having an upstream side and a downstream side,
    blades extending radially from the disc, and the roots of which are engaged axially and held radially in the slots of the disc,
    platforms extending circumferentially from the blades and which are arranged circumferentially end to end, opposite each other,
    axial sealing device for at least one of an upstream and a downstream sealing of an annular zone extending radially between the platforms and the disc,
wherein said sealing device comprises radially an internal annular part and an external annular part structurally separate from each other, the external annular part of the sealing device comprising a frustoconical wall extending inwards from an external radial end, and the internal annular part of the sealing device comprising at an external radial end an annular stepped rim in axial abutment against the internal end of the frustoconical wall, which can slide radially along the annular stepped rim of the internal annular part, an annular seal being interposed axially between the axial ends of the blades and the frustoconical wall of the external annular part, so that said annular seal pushes the frustoconical wall downstream, which axially forces the internal end of the frustoconical wall against the stepped rim so as to seal together the internal annular part and the external annular part of the sealing device.

2. The rotary assembly according to claim 1, wherein the internal annular part comprises a radial outer end and the external annular part comprises a radial inner end, said radial outer and inner ends are facing each other and are adapted for relative radial movements by sliding sealingly, so that the platforms only absorb centrifugal forces created by rotation of the external annular part.

3. The rotary assembly according to claim 1 wherein the internal annular part and the external annular part of the sealing device each comprise a ring located opposite the annular zone which extends radially between the platforms and the disc.

4. The rotary assembly according to claim 1, wherein air circulation means are formed on one of a disc and the internal annular part of the sealing device, and configured so as to allow air to circulate between the upstream side and/or downstream side of the rotary assembly and the slots.

5. The rotary assembly according to claim 1, wherein the external annular part of the sealing device comprises an external end engaged in a radial annular groove formed on the internal faces of the platforms, and the internal annular part of the sealing device provides axial locking of the external annular part against the annular zone extending radially from the platforms to the disc.

6. The rotary assembly according to claim 1, wherein the internal annular part of the sealing device is held radially by the disc.

7. The rotary assembly according to claim 1, wherein:
    the rotary assembly comprises a sealing ring comprising an annular arm and annular sealing lips adapted to cooperate sealingly with an external stator element, and,
    the internal annular part of the sealing device is held axially against the disc and the blades by said annular arm.

8. The rotary assembly according to claim 1, wherein:
    the internal annular part of the sealing device comprises an annular hook part engaged with at least one rim of one of the faces of the disc for a radial relative locking,
    and the rims of the disc are formed by internal faces of a plurality of projecting portions situated on one of the faces of the disc internally with respect to the bottoms of the slots of the disc, and following each other circumferentially discontinuously, the annular hook part of the internal annular part of the sealing device extending radially from the zone situated radially between:
        the locations where the teeth of the disc bear against the blade roots in operation, and
        the bottoms of the slots,
up to the internal faces of the projecting portions, the annular hook part furthermore not being in axial abutment against the disc at least locally so as to enable air to circulate between the upstream and/or downstream side of the rotary assembly and the slots.

9. The rotary assembly according to claim 1, wherein:
    the internal annular part of the sealing device comprises an annular hook part engaged with at least one rim of one of the faces of the disc for radial relative locking,
    and the rims of the disc are formed by internal faces of a plurality of projecting portions situated on the external parts of the radial faces of the teeth of the disc, and follow each other circumferentially discontinuously, the internal end of the annular hook part engaged on these internal faces being furthermore in axial contact with the teeth of the disc and the blade roots at the locations where the teeth of the disc bear against the blade roots in operation.

10. The rotary assembly according to claim 1, wherein the blades comprise a ceramic matrix composite.

11. A turbomachine turbine, characterised in that the turbomachine turbine comprises the rotary assembly according to claim 1.

12. A turbomachine, characterised in that the turbomachine comprises the rotary assembly according to claim 1.

* * * * *